United States Patent
Browne et al.

(10) Patent No.: US 12,459,615 B2
(45) Date of Patent: Nov. 4, 2025

(54) PIVOTING AUV/UUV DOCK FOR USE WITH A WAVE ENERGY CONVERTER

(71) Applicant: University of Massachusetts, Boston, MA (US)

(72) Inventors: Gregory E Browne, Bridgewater, MA (US); Christopher M Meninno, Taunton, MA (US); Daniel G MacDonald, Mashpee, MA (US); Mehdi Raessi, North Dartmouth, MA (US)

(73) Assignee: University of Massachusetts, Boston, MA (US)

( * ) Notice: Subject to any disclaimer, the term of this patent is extended or adjusted under 35 U.S.C. 154(b) by 664 days.

(21) Appl. No.: 17/845,015

(22) Filed: Jun. 21, 2022

(65) Prior Publication Data
US 2022/0403812 A1 Dec. 22, 2022

Related U.S. Application Data

(60) Provisional application No. 63/212,923, filed on Jun. 21, 2021.

(51) Int. Cl.
*B63G 8/00* (2006.01)
*B63B 27/16* (2006.01)
*B63C 7/20* (2006.01)

(52) U.S. Cl.
CPC .............. *B63C 7/20* (2013.01); *B63B 27/16* (2013.01); *B63G 8/001* (2013.01); *B63B 2027/165* (2013.01); *B63G 2008/008* (2013.01)

(58) Field of Classification Search
CPC ..... B63C 7/20; B63B 27/16; B63B 2027/165; B63G 8/001; B63G 2008/008; B63G 2008/002; B63G 2008/004; F03B 13/20; F03B 13/14; F05B 2220/00
See application file for complete search history.

(56) References Cited

U.S. PATENT DOCUMENTS

| | | | |
|---|---|---|---|
| 7,798,086 B2 * | 9/2010 | Ruggaber | ................. B63C 7/16 114/316 |
| 9,592,895 B2 * | 3/2017 | Yu | ........................ B63G 8/001 |
| 10,759,508 B2 | 9/2020 | Sakaue et al. | |

(Continued)

OTHER PUBLICATIONS

Zhang, J., Chen, Z., Sun, X., Deng, B., "UC Berkeley Water Bears: Mobile AUV Power Station." University of California, Berkeley, 2020.

(Continued)

*Primary Examiner* — Anthony D Wiest
(74) *Attorney, Agent, or Firm* — Hinckley Allen & Snyder; Stephen Holmes

(57) ABSTRACT

An AUV/UUV docking station is provided that is tethered to a wave energy converter that is in turn tethered to a flotation buoy. The AUV/UUV docking station has a cone for directing an AUV/UUV into a charging dock that is rotatable between a horizontal docking position and a vertical charging position such that in the vertical position the docking station and docked AUV/UUV have a reduced profile so as not to interfere with the operation of the wave energy converter. Energy from the wave energy converter is directed to the dock to charge the AUV/UUV.

12 Claims, 3 Drawing Sheets

(56) References Cited

U.S. PATENT DOCUMENTS 11,586,198 B2    2/2023   Mukaida et al.

OTHER PUBLICATIONS

Offshore Staff. "ROV/AUV System Proves Docking Capability." Offshore Magazine, Feb. 15, 2019. https://www.offshore-mag.com/subsea/article/16791055/rovauv-system-proves-docking-capability.
Y. Sato, T. Maki, K. Masuda, T. Matsuda and T. Sakamaki, "Autonomous docking of hovering type AUV to seafloor charging station based on acoustic and visual sensing," 2017 IEEE Underwater Technology (UT), Busan, Korea (South), 2017, pp. 1-6, doi: 10.1109/UT.2017.7890282.
Driscol, Blake P., Gish, L. Andrew, and Coe, Ryan Geoffrey. Wave-powered AUV Recharging: A Feasibility Study . . . United States: N. p., 2019. Web. doi:10.1115/OMAE2019-95383.
Mingwei Lin, Ri Lin, Canjun Yang, Dejun Li, Zhuoyu Zhang, Yucheng Zhao, Wangjie Ding, Docking to an underwater suspended charging station: Systematic design and experimental tests, Ocean Engineering, vol. 249, 2022, 110766, ISSN 0029-8018, https://doi.org/10.1016/j.oceaneng.2022.110766. (https://www.sciencedirect.com/science/article/pii/S0029801822002141).
Sun, X, Deng, Bruce, Zhang, Jerry, et al., UC Berkeley Berkeley Scientific Journal, Reimagining Autonomous Underwater Vehicle Charging Stations with Wave Energy Permalink, https://escholarship.org/uc/item/7hs535wq, Berkeley Scientific Journal, 25(2) ISSN, 1097-0967, Publication Date 2021 DOI 10.5070/BS325254504.

\* cited by examiner

PIVOTING AUV/UUV DOCK FOR USE WITH A WAVE ENERGY CONVERTER

CROSS-REFERENCE TO RELATED APPLICATIONS

This application is related to and claims priority from earlier filed U.S. Provisional Patent Application No. 63/121,923, filed Jun. 21, 2021.

BACKGROUND OF THE DISCLOSURE

The present disclosure generally relates to a wave energy converter (WEC) system. More specifically, the present disclosure relates to a docking system that is interconnected with a WEC and provides for charging an underwater vehicle.

A variety of wave energy conversion (WEC) technologies have been proposed to capture energy from ocean waves. In general, the prior art systems can be separated into several broad classes of devices:

Oscillating Water Columns—these devices utilize an enclosed box with its bottom open to the ocean. Water entering the box associated with the crest of the wave pushes air out through a small conduit, which is used to drive a turbine producing electricity. As the wave recedes, air is drawn into the box through the same (or a separate) conduit, again driving a turbine to produce electricity.

Overtopping Devices—these devices allow incoming waves to break over the top edge of the device leaving water trapped in a small reservoir. As the water drains, it turns a turbine, creating electricity.

Point Absorbers—these are moored devices, or buoys, that move up and down on the water surface. There are several methods of converting the up and down motion of the point absorber to electricity, but all point absorbers work by exploiting the motion of the wave relative to a fixed, or minimally moving, reference frame. In some cases, the point absorber might be attached to a rigid structure, such as a pier or breakwater in the coastal zone, resulting in relative motion between the wave and the fixed infrastructure. In open waters, a point absorber must operate by exploiting the relative motion between the ocean surface, and relatively calm deeper waters. Motion associated with a wave decreases exponentially away from the surface, with a layer of no motion generally reached at a depth equal to approximately one half the horizontal wavelength.

Oscillating Wave Surge Converters—these can be thought of as submerged flappers that move back and forth as a wave passes. This flapping motion is then converted to electricity through a variety of methods. Sometimes the motion is used to pump seawater to shore where the electrical generating process takes place.

Submerged Pressure Differential Devices—like surge converters, these devices use pressure differences on the seafloor as a wave passes to pump seawater which can then be used to drive a turbine.

Attenuators—these devices float at the surface with a number of joints. As the device flexes due to surface wave action, pistons within the joints drive high pressure oil through hydraulic motors which then drive turbines to produce electricity.

Autonomous Underwater Vehicles (AUV) or Unmanned Underwater Vehicles (UUV) are also in a state of rapid commercial development and deployment and there exists a need for highly versatile underwater docking stations to recharge the battery systems of these vehicles so that they do not have to be removed from the water.

AUV/UUV(s) are generally powered by an onboard battery that requires periodic recharging. As a result, the AUV/UUV often must be retrieved and recharged to prepare for redeployment.

There is therefore a need for a system and method to recharge a deployed AUV/UUV. Further, there is a need for highly versatile underwater docking stations to recharge the battery systems of these vehicles so that they do not have to be removed from the water.

BRIEF SUMMARY OF THE DISCLOSURE

In this regard, the present disclosure describes a unique pivoting docking station which can be interconnected and utilized with a variety of different wave energy converters and energy storage devices to capture and hold the AUV/UUV while it is charging. While this is an enabling technology that could benefit many different WEC devices, it is particularly relevant to point absorber designs.

The present system allows the AUV/UUV to be captured horizontally using a cone guide and cylinder but is adapted to include a frame which allows the entire docking station to pivot once the AUV/UUV is captured. A movable weight is incorporated to change the center of gravity of the device to effect pivoting between horizontal and vertical positions. The vertical position is advantageous to point absorber WECs as it presents a vertical profile with less drag and allows the point absorber type WEC to continue to function normally while the AUV/UUV is charging.

It is therefore an object of the present disclosure to provide a method and system to recharge a deployed AUV/UUV. Further, it is an object of the present disclosure to provide a highly versatile underwater docking stations to recharge the battery systems of these vehicles so that they do not have to be removed from the water.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated an exemplary embodiment of the invention.

BRIEF DESCRIPTION OF THE DRAWINGS

In the drawings which illustrate the best mode presently contemplated for carrying out the present disclosure.

DETAILED DESCRIPTION OF THE DISCLOSURE

Figure 1:
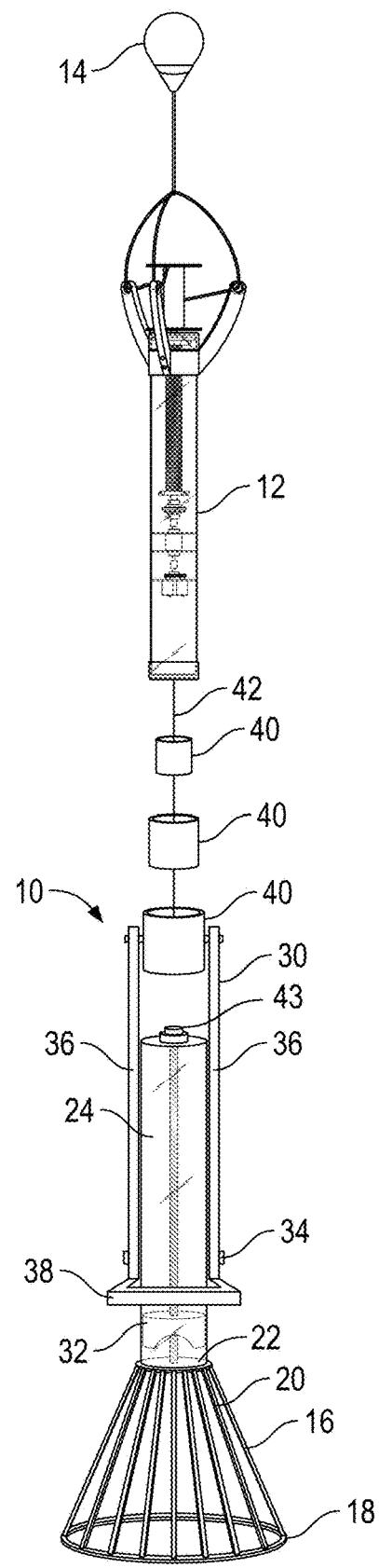
FIG. 1 is a front perspective view of an AUV/UUV charging dock connected to a WEC system in accordance with the present disclosure.

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

Now referring to the drawings, a pivoting docking station which can be interconnected and utilized with a variety of different wave energy converters and energy storage devices to capture and hold the AUV/UUV while it is charging is shown and illustrated.

Figure 2:
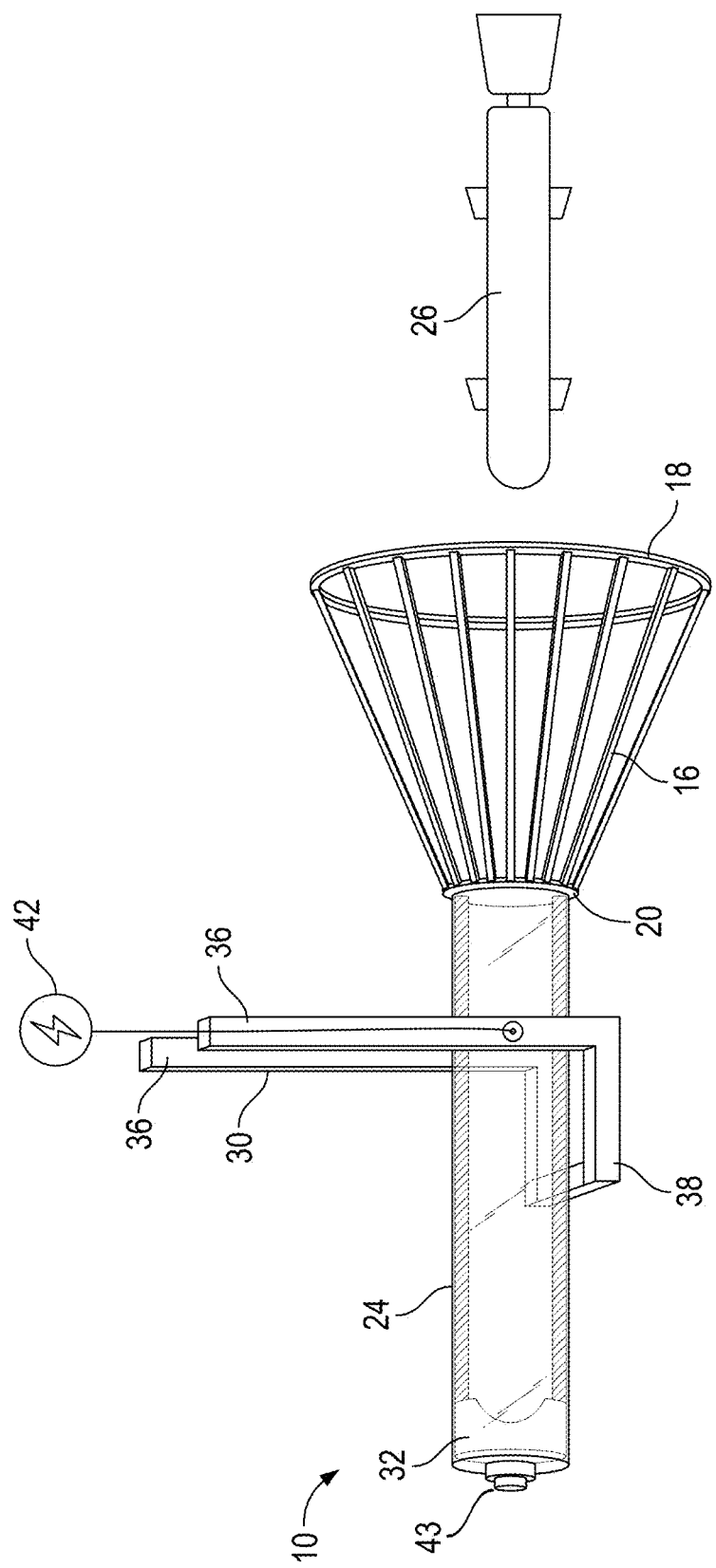
FIG. 2 is an illustration of an AUV/UUV charging dock in a docking mode in accordance with the present disclosure.
Figure 3:
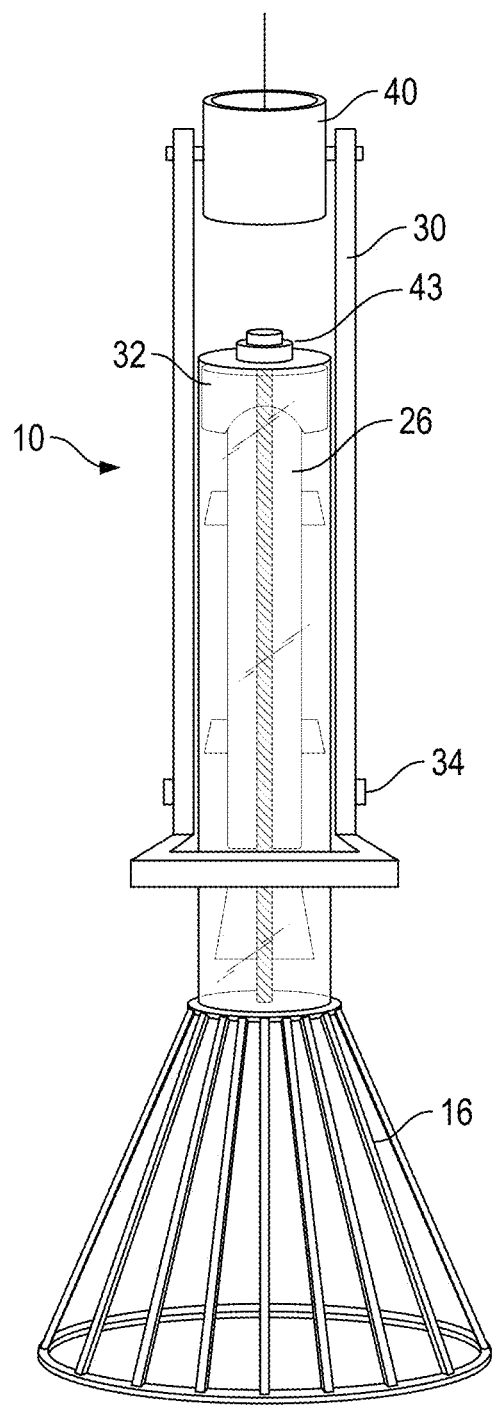
FIG. 3 is an illustration of an AUV/UUV charging dock in a charging mode in accordance with the present disclosure.

Parts and components are labeled throughout the drawing figures for clarity. Referring to FIGS. 1-3, the present disclosure describes a unique Autonomous Underwater Vehicle (AUV) or Unmanned Underwater Vehicle (UUV) docking station and associated wave energy converter (WEC). While this is an enabling technology that could benefit many different WEC devices, it is particularly relevant to point absorber designs as described above.

All point absorber WECs work by exploiting the motion of the wave relative to a fixed, or minimally moving, reference frame. In open waters, a point absorber must operate by exploiting the relative motion between the ocean surface, and relatively calm deeper waters. This motion is anchored or fixed at the surface by a buoy. Upward and downward motion of the wave energy converter below the surface is controlled and dampened by tethered ballast devices which can be varied in design, function and shape. Further, as known in the art, the WEC may include battery arrays for storing energy generated by the device. Additional operational details of WEC devices are well known in the art and will not be further detailed herein.

Turning now to FIG. 1, an AUV/UUV docking station 10 is shown and generally illustrated as being tethered to a WEC 12 that is in turn tethered to a flotation buoy. 14 The AUV/UUV docking station 10 generally consists of a lower cone portion 16 that has a larger diameter open end 18 that tapers to a diameter at the upper end 20 of the cone 16 that is slightly wider than the vehicle to be charged. The top end 20 of the cone 16 is attached to the lower end 22 of a cylinder 24 where the cylinder 24 is the same diameter as the smallest diameter of the cone 16. This arrangement where the cone 16 leads into a cylinder 24 allows the AUV/UUV to be guided into the cylinder 24 by the cone 16 and the forward momentum of the AUV/UUV while allowing some degree of positional error on the vehicle's part. The cylinder 24 is where the AUV/UUV remains while charging. Charging of the AUV/UUV may be done by a direct connection between the dock and the AUV/UUV or using known inductive charging technology.

Turning now to FIGS. 2 and 3, the docking station 10 of the present disclosure is shown in a docking position (FIG. 2) and a charging position (FIG. 3). In the docking position, the docking station 10 allows a deployed AUV/UUV 26 to be navigated into the large end 18 of the cone 16 captured horizontally using the cone 16 to guide the AUV/UUV 26 and center it at the smaller end 20 of the cone 16 and into the cylinder 24. Further, the docking station 10 includes a support frame 30 and a movable weight 32 which allows the entire docking station to pivot vertically, as will be described in detail below, once the AUV/UUV 26 is captured within the cylinder 24. Operationally, the movable weight 32 is incorporated to change the center of gravity cylinder 24 and cone 16 arrangement to effect pivoting between horizontal docking (FIG. 2) and vertical charging positions (FIG. 3) about a pivot point 34 by which the cylinder 24 is attached to the frame 30.

As stated above, the vertical position is advantageous when the docking station 10 is used in connection with point absorber WECs as it presents a reduced vertical profile that creates less unintended drag thereby allowing the point absorber type WEC to continue to function normally while the AUV/UUV 10 is docked and is charging.

More specifically, in operation the novel adaptation consists of a frame 30 that is formed by two parallel rigid frame members 36 which are attached at their top ends to the bottom of a submersed object, such as a point absorber WEC 12 as illustrated in FIG. 1. These frame members 36 extend below the submersed object and the tethered ballast of WEC 40 at a distance that is sufficient fit the docking station 10 in a vertical orientation. At the lower end, the frame members 36 can be seen to be bent in the same direction and at an angle that keeps them parallel to one another, then the lower cross member 38 can be seen connecting the two frame members 36 together after the bend.

Slightly above the bend in each of the frame members 36 there can be seen a pivotally pinned connection 34 between the frame 30 and the cylinder 24 portion of the docking station 10. This connection allows the cylinder 24 portion of the docking station to hang vertically or to be pivoted to rest horizontally on the cross member 38. As noted above, this pivoting would be accomplished by use of a movable mass that could be extended away from the pivot point along the body of the docking station or retracted back to the pivot point enabling the adjusting of the center of gravity of the docking station. This adjusting of the center of gravity would be used to change between the two orientations.

An electrical connection 42 extends between the docking station charging port 43 and the WEC 12 to supply energy to the docked AUV/UUV 26.

It can therefore be seen that the present disclosure provides easily deployable, reliable recharging power at sea to AUV/UUV devices while still allowing the WEC to function normally. Further, the present disclosure provides a method and system to recharge a deployed AUV/UUV. Still further, the present disclosure provides a highly versatile underwater docking stations to recharge the battery systems of these vehicles so that they do not have to be removed from the water.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A docking system for an underwater vehicle comprising:
    a support frame;
    a cylinder for receiving an AUV/UUV to be charged, said cylinder pivotally attached to said support frame and movable between a horizontal docking position and a vertical charging position;
    a cone affixed to a bottom end of the cylinder; and
    a weight movable along a length of the cylinder;
    wherein said weight is selectively movable from one end of the cylinder to an opposing end of the cylinder to change a center of gravity of the cylinder and effect pivoting of the cylinder between said horizontal and vertical positions.

2. The docking system of claim 1, said frame further comprising:
    at least two vertical frame members; and
    a horizontal member connecting a lower end of said two vertical frame members,
    wherein said cylinder in said horizontal docking position rests against said horizontal member.

3. The docking system of claim 1, further comprising:
    a charging port on an interior of said cylinder.

4. The docking system of claim 3, wherein said charging port is a direct connection type charging port.

5. The docking system of claim 3, wherein said charging port is an inductive charging port.

6. The docking system of claim 3, further comprising:
    an electrical connection extending from said charging port to a mooring tether at a top end of said support frame.

7. The docking system of claim 1, wherein said docking system is attached to a wave energy converter device by a mooring tether, said docking system including a charging port on an interior of said cylinder and an electrical connection extending from said charging port to an output on said wave energy converter.

8. A charging apparatus for an underwater vehicle comprising:
    a wave energy converter device;
    a docking station mechanically and electrically coupled to said wave energy converter device,
    said docking station comprising:
        a support frame;
        a cylinder for receiving an AUV/UUV to be charged, said cylinder pivotally attached to said support frame and movable between a horizontal docking position and a vertical charging position;
        a cone affixed to a bottom end of the cylinder; and
        a weight movable along a length of the cylinder;
    wherein said weight is selectively movable from one end of the cylinder to an opposing end of the cylinder to change a center of gravity of the cylinder and effect pivoting of the cylinder between said horizontal and vertical positions.

9. The charging apparatus claim 8, said frame further comprising:
    at least two vertical frame members; and
    a horizontal member connecting a lower end of said two vertical frame members,
    wherein said cylinder in said horizontal docking position rests against said horizontal member.

10. The charging apparatus claim 8, further comprising:
    a charging port on an interior of said cylinder, said charging port electrically coupled to said wave energy converter.

11. The charging apparatus claim 10, wherein said charging port is a direct connection type charging port.

12. The charging apparatus claim 10, wherein said charging port is an inductive charging port.

* * * * *